Patented Mar. 14, 1950

2,500,543

UNITED STATES PATENT OFFICE 2,500,543

ANTIOXIDANT

Lloyd A. Hall, Chicago, Ill., assignor to The Griffith Laboratories, Inc., a corporation of Illinois No Drawing. Application July 20, 1945
Serial No. 606,282

14 Claims. (Cl. 99—163)

This invention relates to an antioxidant and more particularly to an antioxidant composition with non-toxic qualities. It is an object of the invention to provide an antioxidant material for stabilizing and preserving such food substances as butter, salad dressings, mayonnaise, cheese spreads, whole milk powder, egg powder, margarine, lanolin, and other fatty food products, or food products containing amounts of fatty matter sufficiently large to make them subject to rancidity development and which contain a considerable amount of moisture or water in the form of an emulsion.

It has been found difficult properly to incorporate a good many antioxidant materials in emulsified fats. This is due to the water phase which permits improper protection of the fatty matter because of separation. For example, propyl gallate is an excellent antioxidant but it is not readily soluble in oil mixtures. Further, it is practically insoluble in fatty emulsions or those products which contain water as a part of their composition. Propyl gallate is, however, very freely soluble in propylene glycol, and propylene glycol is readily miscible with emulsions or with fatty mixtures which contain water. Other gallic acid esters may likewise be incorporated in similar solvents. Likewise ascorbic acid and its esters, such as isoascorbyl palmitate, may be dissolved in propylene glycol and then incorporated in the fats and fatty emulsions.

As an example of the invention, 4 lbs. of propyl gallate is dissolved in 96 lbs. of propylene glycol. This solution is effected with agitation at a temperature of 120° F. The resulting solution is clear and transparent. The resulting solution may be employed in very small proportion, preferably at the ratio of about 4 oz. to 100 lbs. of fat or oil to be protected. The amounts may be increased beyond this without undesirable effects and may be reduced below it if the amount of protection required is not as great as normal.

My antioxidant composition is particularly desirable and efficient for such products as salad dressings, and in the manufacture of egg powder and whole milk powder. A good salad dressing contains, among other ingredients, approximately 42% water and 42% vegetable oil (corn or cottonseed oil). Rancidity development (which is a frequent occurrence in these products), is due largely to this high percentage of oil. The stability of these dressings can be materially increased by the addition of 0.25% to 0.50% of my antioxidant composition either to the fat or oil before emulsification or incorporation with the other ingredients.

One of the reasons for the unpalatability of egg powder is the rancidity developed by the egg fat. In the processing of whole eggs for the manufacture of whole egg powder, the liquid whole eggs are whipped together, forming an emulsion before pumping to the spray nozzles before atomizing into the spray dryer. When my antioxidant composition is added to the egg emulsion in an amount 2 oz. to 4 oz. per 100 lbs. of emulsion and the product dried, the egg powder is many times more stable against rancidity and consequent unpalatability. In this example, it should be understood the liquid whole eggs contain an average of 73.7% water and 10.5% fat, and that any antioxidant used must either be emulsifiable or be incorporated in an edible solvent which is water miscible. Propylene glycol is water miscible and chronic toxicity studies have proved it is non-toxic. Egg powder contains an average of from 2% to 5% water and 45% to 50% fat. The use of my antioxidant composition in this product eliminates the need of gas-packing as frequently done at present to extend the keeping time of egg powders.

Whole milk powder has not found a ready market because of unpalatability due to rapid rancidity development of butter fat it contains. This is also true of cream powder. Whole milk powder averages 25% to 35% fat and 1.5% to 5% water. My antioxidant in amounts of 0.125% to 0.25% can be added to protect the stability of the butter fat, preferably after vacuum pan concentration, although it can be added at any time during the manufacture of the powder before drying.

The ratio of propyl gallate to propylene glycol is not critical, since the latter is essentially a carrier for the former. The important element is the proportion of gallic acid ester in the final product. It is there normally from .0005% to .005% of the fat to be protected.

The proportion of the ascorbyl palmitate and ascorbic acid esters is normally about the same as that of propyl gallate.

The foregoing detailed description has been given for clearness of understanding only, and no unnecessary limitations should be understood therefrom.

What I claim as new, and desire to secure by Letters Patent, is:

1. An antioxidant composition comprising a solution of an antioxidant acid ester selected from the group consisting of esters of ascorbic and gallic acid, which ester is soluble in propylene glycol, in propylene glycol.

2. A composition as set forth in claim 1, in which the antioxidant ester is a gallic acid ester.

3. A composition as set forth in claim 1, in which the antioxidant ester is propyl gallate.

4. A composition as set forth in claim 1, in which the antioxidant ester is ascorbic acid ester.

5. A composition as set forth in claim 1, in which the antioxidant ester is ascorbyl palmitate.

6. An antioxidant composition consisting of a small proportion of propyl gallate and a large proportion of propylene glycol.

7. An antioxidant composition consisting of less than 10% propyl gallate and more than 90% of propylene glycol.

8. A food composition comprising a fatty substance containing an important percentage of water having distributed therethrough an antioxidant composition comprising a solution of an antioxidant acid ester selected from the group consisting of esters of ascorbic and gallic acid, which ester is soluble in propylene glycol, in propylene glycol.

9. A food composition as set forth in claim 8, in which the fatty material is egg powder.

10. A food composition as set forth in claim 8, in which the fatty material is whole milk powder.

11. A food composition as set forth in claim 8, in which the fatty material is salad dressing.

12. A food composition comprising a fatty substance containing an important percentage of water having distributed therethrough an antioxidant composition comprising propylene glycol and a small proportion of a nontoxic ester of an acid selected from the group consisting of ascorbic and gallic acid, which ester is soluble in the propylene glycol.

13. A food composition comprising a fatty substance containing an important percentage of water having distributed therethrough an antioxidant composition comprising propylene glycol and a small proportion of propyl gallate.

14. A food composition comprising a fatty substance containing an important percentage of water having distributed therethrough an antioxidant composition comprising propylene glycol and a small proportion of propyl gallate, the proportion of propyl gallate in the food composition being approximately .0005 to .005% of the fatty constituent thereof.

LLOYD A. HALL.

REFERENCES CITED

The following references are of record in the file of this patent:

UNITED STATES PATENTS

| Number | Name | Date |
| --- | --- | --- |
| 1,784,360 | Kaegebehn | Dec. 9, 1930 |
| 2,198,200 | Musher | Apr. 23, 1940 |
| 2,205,620 | Crocker | June 25, 1940 |
| 2,255,191 | Sabalitschka | Sept. 9, 1941 |
| 2,383,816 | Riemenschneider | Aug. 28, 1945 |